US009956508B2

(12) United States Patent
Herman et al.

(10) Patent No.: US 9,956,508 B2
(45) Date of Patent: May 1, 2018

(54) FILTER ELEMENT WITH AIR VENT

(71) Applicant: Cummins Filtration IP, Inc., Columbus, IN (US)

(72) Inventors: Peter Herman, Stoughton, WI (US); Jeffrey B. Sharp, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 144 days.

(21) Appl. No.: 14/783,323

(22) PCT Filed: Apr. 8, 2014

(86) PCT No.: PCT/US2014/033305
§ 371 (c)(1),
(2) Date: Oct. 8, 2015

(87) PCT Pub. No.: WO2014/172145
PCT Pub. Date: Oct. 23, 2014

(65) Prior Publication Data
US 2016/0074778 A1    Mar. 17, 2016

Related U.S. Application Data

(60) Provisional application No. 61/812,354, filed on Apr. 16, 2013.

(51) Int. Cl.
*B01D 27/10*   (2006.01)
*B01D 29/11*   (2006.01)
*B01D 35/30*   (2006.01)
*B01D 35/147*  (2006.01)
(Continued)

(52) U.S. Cl.
CPC ............ *B01D 27/103* (2013.01); *B01D 29/11* (2013.01); *B01D 35/147* (2013.01); *B01D 35/30* (2013.01); *B01D 36/001* (2013.01); *F01M 1/10* (2013.01); *B01D 2201/0415* (2013.01); *B01D 2201/291* (2013.01); *B01D 2201/305* (2013.01); *F01M 2001/1007* (2013.01)

(58) Field of Classification Search
None
See application file for complete search history.

(56) References Cited

U.S. PATENT DOCUMENTS

| 3,726,403 A | * | 4/1973 | Shaltis | ................... | B01D 17/10 210/132 |
| 3,822,787 A | * | 7/1974 | Shaltis | ................... | B01D 17/10 210/132 |
| 4,175,398 A | | 11/1979 | Edwards et al. | | |

(Continued)

OTHER PUBLICATIONS

Search Report and Written Opinion for PCT/US2014/033305, dated Aug. 25, 2014, 16 pages.

*Primary Examiner* — Benjamin M Kurtz
(74) *Attorney, Agent, or Firm* — Foley & Lardner LLP

(57) ABSTRACT

A method and means are described for rapidly evacuating trapped air from the top of a top-loaded liquid filter housing. An air vent means is provided that prevents complete sealing between a bypass valve and a sealing surface on an endcap of a replaceable filter element. The air vent means enables the rapid evacuation of trapped air in the top of the housing chamber, but permits only a negligible flow rate of liquid, for example oil, through the air vent means once air is evacuated due to high viscosity ratio of liquid, such as oil, versus air.

10 Claims, 9 Drawing Sheets

(51) Int. Cl.
*B01D 36/00* (2006.01)
*F01M 1/10* (2006.01)

(56) References Cited

U.S. PATENT DOCUMENTS

| | | | |
|---|---|---|---|
| 4,753,724 A | | 6/1988 | Womble |
| 5,334,309 A | | 8/1994 | Huggett et al. |
| 5,770,054 A | * | 6/1998 | Ardes ................ B01D 29/21 |
| | | | 210/130 |
| RE38,917 E | | 12/2005 | Ardes |
| 2006/0243226 A1 | | 11/2006 | Bontaz et al. |
| 2007/0102331 A1 | * | 5/2007 | Schaerlaeckens ... B01D 27/103 |
| | | | 210/130 |
| 2007/0240537 A1 | | 10/2007 | Basham |
| 2009/0230063 A1 | * | 9/2009 | Hawkins ............. B01D 35/147 |
| | | | 210/767 |
| 2012/0000029 A1 | | 1/2012 | Nicolaou et al. |
| 2013/0233271 A1 | | 9/2013 | Zheng et al. |
| 2013/0327429 A1 | * | 12/2013 | Ardes ................ B01D 35/147 |
| | | | 137/599.11 |

* cited by examiner

FILTER ELEMENT WITH AIR VENT

CROSS REFERENCE TO RELATED APPLICATIONS

The present application is a National Stage of PCT Application No. PCT/US2014/033305, filed Apr. 8, 2014, which claims priority to U.S. Provisional Patent Application Ser. No. 61/812,354 filed Apr. 16, 2013. The contents of these applications are incorporated by reference herein in their entirety.

FIELD

The technology described herein relates to a liquid filter that is provided with an air vent.

BACKGROUND

Top-loaded liquid filter housing module designs, like those used in engine lubrication systems, which use a replaceable filter element removably disposed within a permanent housing and lid assembly, can create a "trapped air" zone above the filter element. These designs can also include a bypass valve on a centertube of the housing. The bypass valve is intended to open during an unusual "cold start" condition when low oil temperatures (and very high oil viscosity) cause such high pressure drop across the filter media that the pleated element structure could be collapsed, thereby necessitating the bypass valve as a "pressure relief" to avoid filter damage. The bypass valve may also open if the filter itself becomes completely plugged with debris, sludge, etc. and creates excessive pressure drop even during normal hot oil (low viscosity) conditions, in which case it is much more important to supply oil to the engine than to provide the continued full-filtration of oil.

During oil change servicing and replacing the filter element by removing the housing lid, removing the filter element (which also allows oil to drain from the housing through a drain feature), inserting a new replacement filter element, and re-attaching the sealed lid, the housing is left in a condition where it is filled mainly with air. Upon starting the engine, the lube pump immediately supplies oil to the housing, filling it from the "bottom up" and pushing the air out of the housing through the filter media and purging it through the lube system passages and ultimately back to the crankcase sump.

However, the air trapped at the top of housing cannot be purged, since it is above the endcap and filter media, and the bypass valve is sealingly engaged with the endcap. This trapped air may cause slightly slower delivery of full operating pressure to critical downstream components such as turbo bearings, main bearings, valve train, etc. due to the compressibility of air acting as an "accumulator" each time the engine is started. In addition, the trapped air, and its compressibility, acting as an accumulator or "air spring," could also cause system pressure/flow pulsation/oscillation/ instability problems due to the complexity of the lube fluid flow circuit containing pressure regulation devices, flow path splits, valves, etc.

SUMMARY

A method and means are described for rapidly evacuating trapped air from the top of a top-loaded liquid filter housing. An air vent means is provided that prevents complete sealing between a bypass valve and a sealing surface on an endcap of a replaceable filter element. The air vent means enables the rapid evacuation of trapped air in the top of the housing chamber, but permits only a negligible flow rate of liquid, for example oil, through the air vent means once air is evacuated due to high viscosity ratio of liquid, such as oil, versus air.

The air vent means can have a number of configurations as long as air can be evacuated and a negligible flow rate of liquid is permitted. The air vent means should allow the air to be quickly purged from the lid zone during pressurization with liquid. Once the air has been purged, the small size of the air vent means (and associated capillary-like viscous flow restriction) dramatically limits the amount of liquid "leakage" flow that can bypass the filter media. For example, in the case of oil as the liquid, the leakage flow would likely be less than 0.01% at normal filter differential pressure and high temperature oil conditions, making the effect on particle removal efficiency and filter performance nil.

In one embodiment, the air vent means comprises a small notch on a filter endcap mating surface that engages with a housing-integral bypass valve. For example, the notch can be less than about 0.5 mm in width and depth. The notch can be molded in to the mating surface of the endcap which seats/mates with surface of the bypass valve. If a notch is used, the notch profile can be square, rounded or any moldable shape. The notch can be radial-linear, or it could be curved in spiral shape on the mating surface, or it could be at some angle relative to radial but still linear. A single notch could be provided, or more than one notch could be used. Other variations on the shape, size and number of notches are possible.

If the amount of unfiltered leakage flow through the air vent means is a concern, in one embodiment a circumferential ring of filter media can be suitably attached to the filter endcap in close proximity to the air vent means to filter the leakage liquid that has passed through the air vent means. The ring of filter media can be attached to the filter endcap in any suitable manner including, but not limited to, bonded via sonic-welding, an adhesive or glue, barbs, staking, and the like.

Alternatively, the circumferential ring of filter media can be suitably attached to the filter endcap in close proximity to the air vent means to filter the leakage liquid before it passes through the air vent means.

If a filter media is used adjacent to the air vent means, the filter media could instead be a patch of filter media located only near the air vent means.

In one embodiment, the air vent means can be formed by the ring of filter media attached to the mating surface of the endcap and engaging with the bypass valve. In this embodiment, the porosity of the ring of filter media provides the air venting, and the filter media also filters any bypass leakage flow.

In another embodiment, the air vent means can be formed by texturing, for example a bumpy texture, on the mating surface of the endcap that permits air venting. The texturing would also essentially filter the leakage liquid by virtue of the texture height which can be, for example, on order of less than 100 micron.

In another embodiment, the air vent means can be formed by one or more small holes formed in the cylindrical sealing flange that extends downwardly from the endcap.

The air vent means can be formed by any one or combination of features mentioned above.

In yet another embodiment, the air vent means is formed on the bypass valve, for example in the conical surface of the bypass valve. In this embodiment, the air vent means could be formed in any one or combination of the features mentioned above. In addition, air vent means could be formed on the cylindrical sealing flange and on the bypass valve.

In one embodiment, a method is provided for air venting from a liquid filter that includes a top load filter housing and a filter element removably installable in the top load filter housing, the top load filter housing includes a centertube and a bypass valve on the centertube, and the filter element includes a cylindrical sealing flange that is designed to engage with the bypass valve when the filter element is installed in the top load filter housing is provided. The method comprises installing the filter element in the filter housing, such that an air vent means formed in the cylindrical sealing flange permits air to bleed past the cylindrical sealing flange. A filter disk may be attached to the cylindrical sealing flange at a position so that the filter disk filters liquid that flows through the air vent means.

In one embodiment, a method is provided for air venting from a liquid filter that includes a top load filter housing and a filter element removably installable in the top load filter housing, the top load filter housing includes a centertube and a bypass valve on the centertube, and the filter element includes a cylindrical sealing flange that is designed to engage with the bypass valve when the filter element is installed in the top load filter housing is provided. The method comprises forming the cylindrical sealing flange of the filter element with an air vent means that permits air to bleed past the cylindrical sealing flange when the liquid filter element is installed in the filter housing. The method may include attaching a filter disk to the cylindrical sealing flange at a position so that the filter disk filters liquid that flows through the air vent means. The filter disk may be attached to the cylindrical sealing flange upstream or downstream of the air vent means.

In another embodiment, a liquid filter element configured for disposition within a filter housing is provided. The liquid filter element comprises a ring of filtration media having a first end and a second end and circumscribing a central cavity, a first endcap sealingly attached to the first end of the filtration media, the first endcap including a centertube opening through which a centertube of the filter housing can pass when the liquid filter element is installed in the filter housing, and a second endcap sealingly attached to the second end of the filtration media, the second endcap including a bypass fluid opening that is opposite and coaxial to the centertube opening in the first endcap. The bypass fluid opening is defined by a cylindrical sealing flange that extends from the second endcap in a direction toward the first endcap and the central cavity, the cylindrical sealing flange includes a free end that is designed to seal with a bypass valve on the centertube when the liquid filter element is installed in the filter housing. The cylindrical sealing flange includes an air vent permitting air to bleed past the cylindrical sealing flange when the liquid filter element is installed in the filter housing. The air vent may be one or more of a notch formed in the free end of the cylindrical sealing flange, a filter disk attached to the free end of the cylindrical sealing flange, a texture provided at the free end of the cylindrical sealing flange, and a hole formed in the cylindrical sealing flange adjacent to the free end. A filter disk may be attached to the cylindrical sealing flange at a position so that the filter disk filters liquid that flows through the air vent. The filter disk may be attached to the cylindrical sealing flange upstream of or downstream of the air vent.

In yet another embodiment, a liquid filter is provided. The liquid filter comprises a filter housing with a removable lid at a top of the housing, a centertube, a bypass valve on the centertube, and a liquid filter element removably disposed within the filter housing. The filter element including a ring of filtration media having a first end and a second end and circumscribing a central cavity, a first endcap sealingly attached to the first end of the filtration media, the first endcap including a centertube opening through which the centertube of the filter housing passes, a second endcap sealingly attached to the second end of the filtration media, the second endcap including a bypass fluid opening that is opposite and coaxial to the centertube opening in the first endcap. The bypass fluid opening is defined by a cylindrical sealing flange that extends from the second endcap in a direction toward the first endcap and the central cavity, the cylindrical sealing flange includes a free end that seals with the bypass valve on the centertube. An air vent is formed on one or both of the cylindrical sealing flange and the bypass valve, the air vent permitting air to bleed past the cylindrical sealing flange and the bypass valve.

DRAWINGS

Figure 3A:
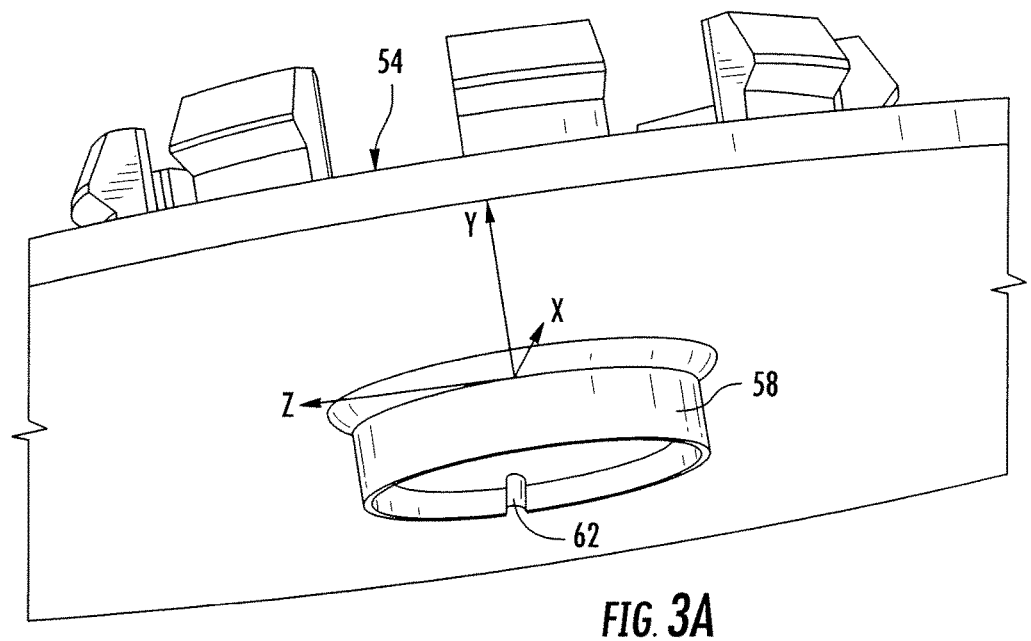
Figure 3B:
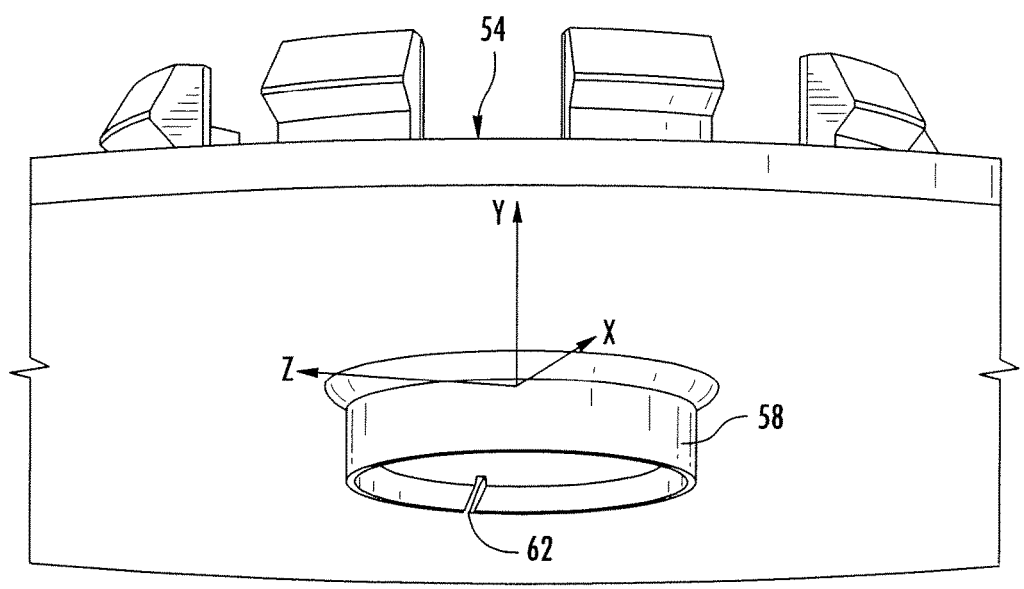
Figure 3C:
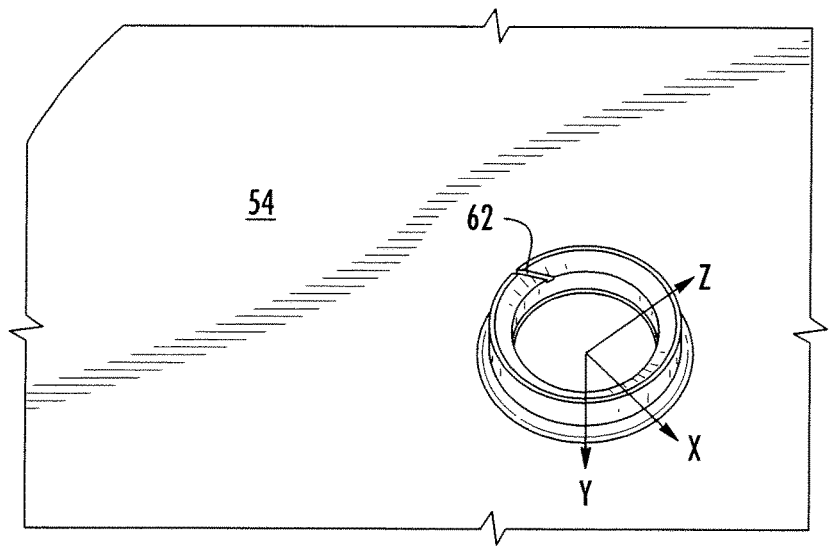

FIGS. 3A-C illustrate examples of different kinds of notches.

Figure 4:
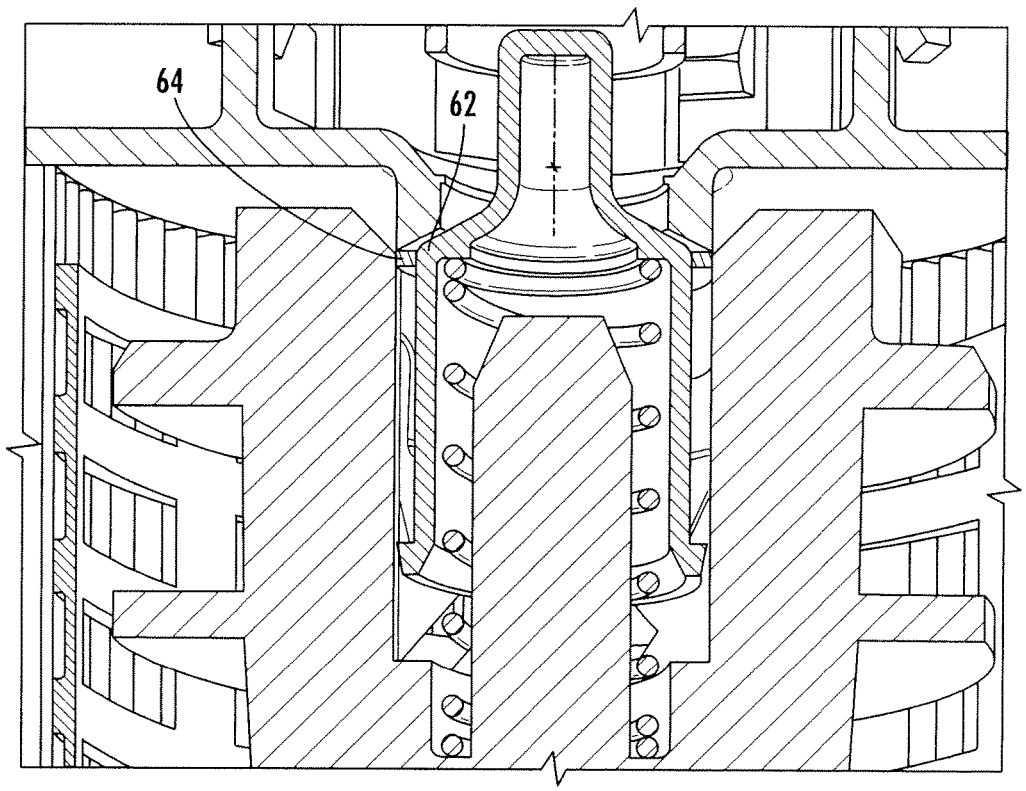

FIG. 4 illustrates an embodiment that uses a filter media immediately downstream of the notch.

Figure 5:
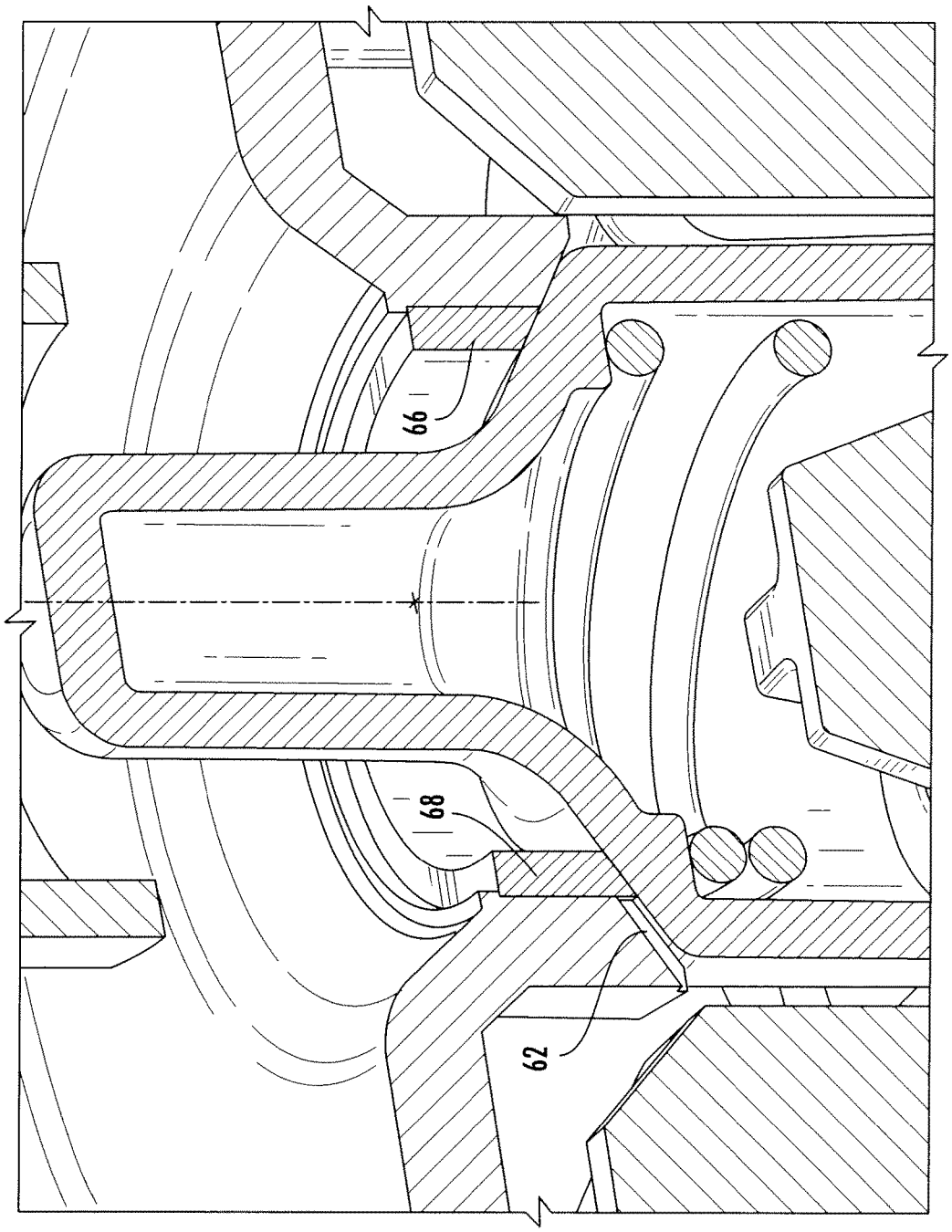

FIG. 5 illustrates an embodiment that uses a filter media immediately upstream of the notch.

Figure 6:
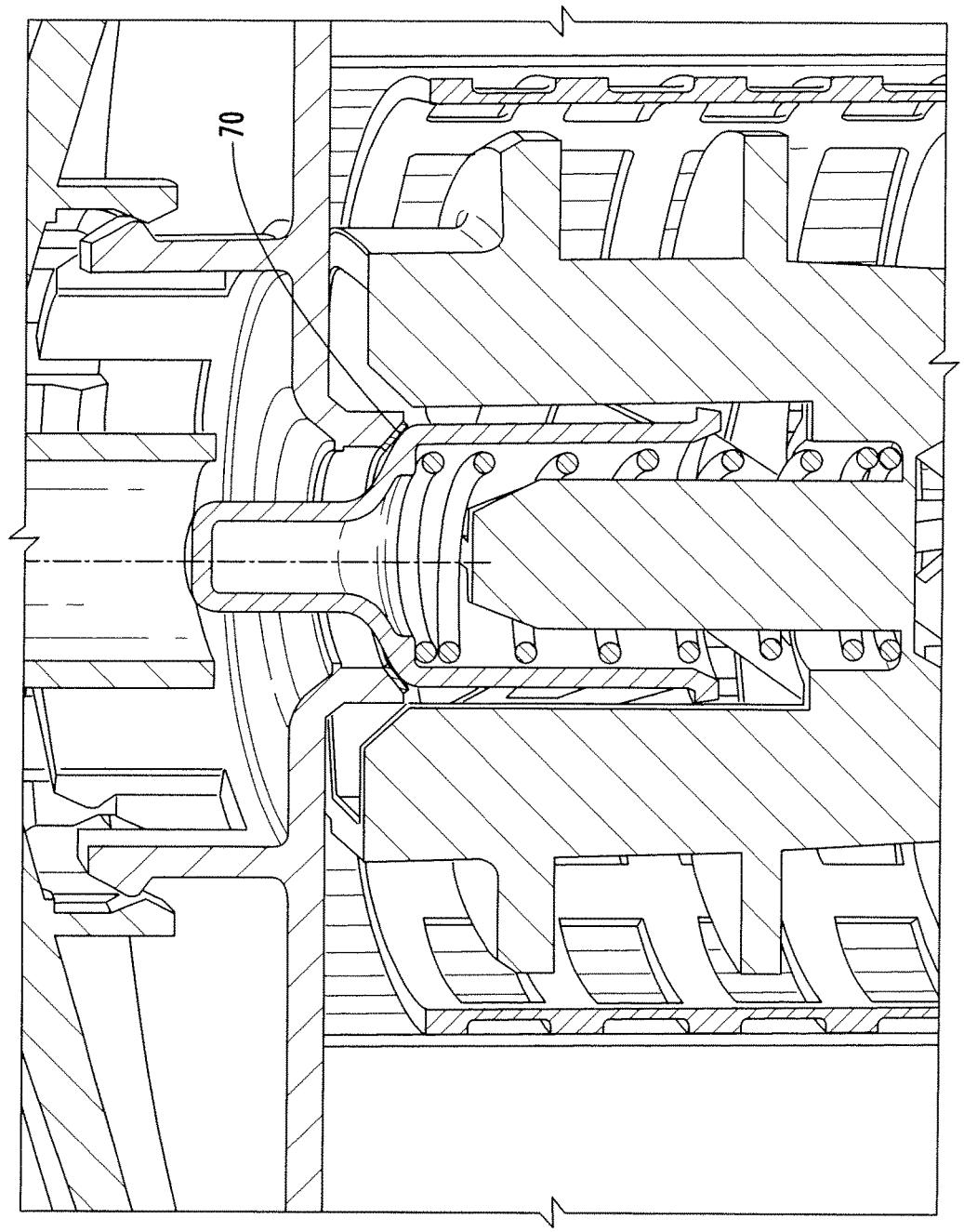

FIG. 6 illustrates an embodiment where a filter media forms the air vent means.

Figure 7:
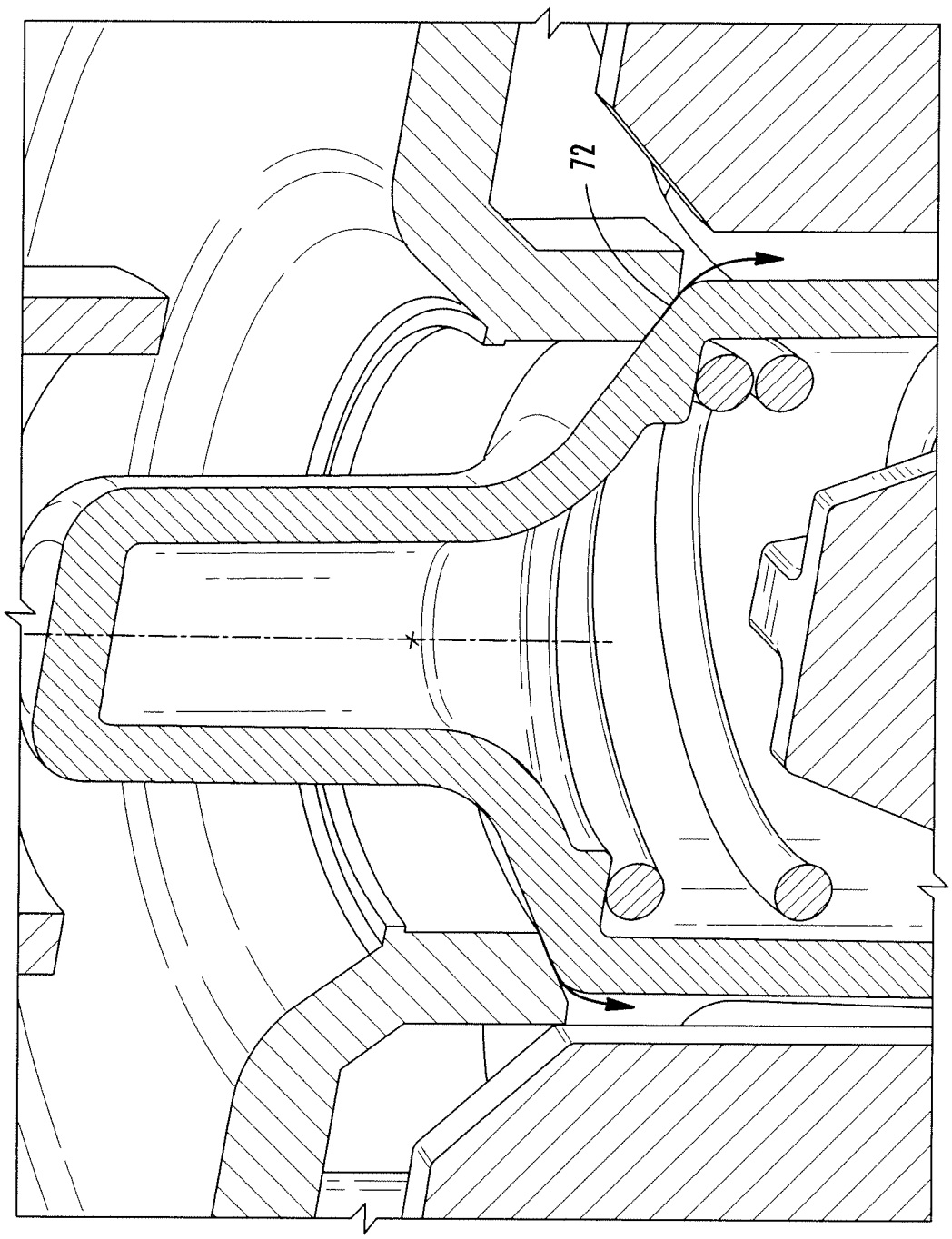

FIG. 7 illustrates an embodiment where a texture on the endcap forms the air vent means.

Figure 8:
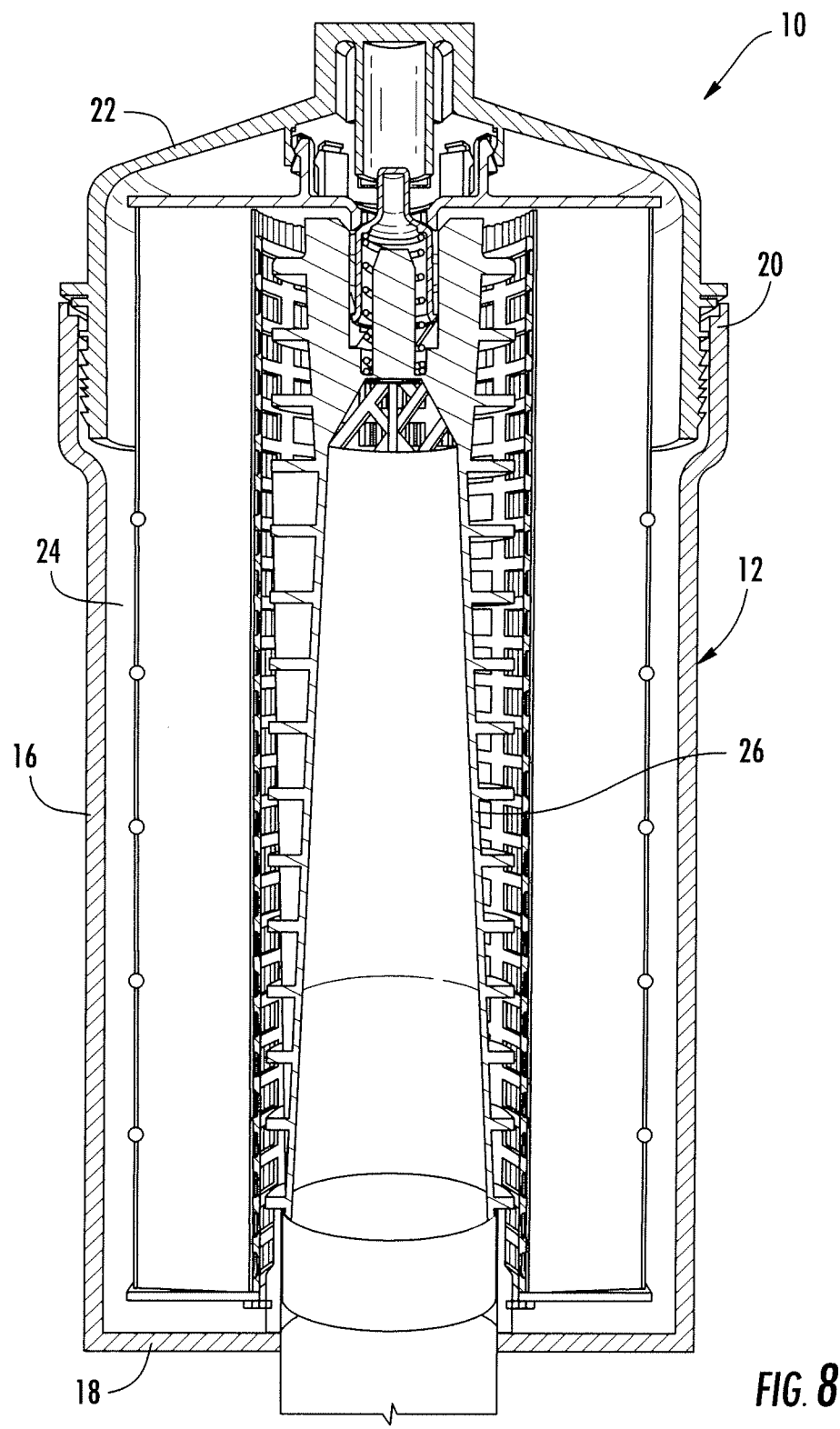

FIG. 8 illustrates the liquid filter including the filter housing and the replaceable filter element.

Figure 9:
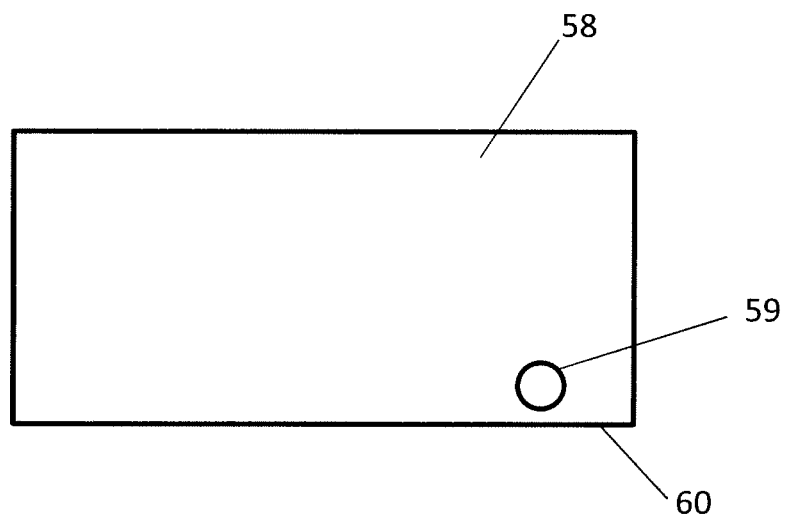

FIG. 9 is a schematic view of a cylindrical sealing flange according to one embodiment.

DETAILED DESCRIPTION

Figure 1:
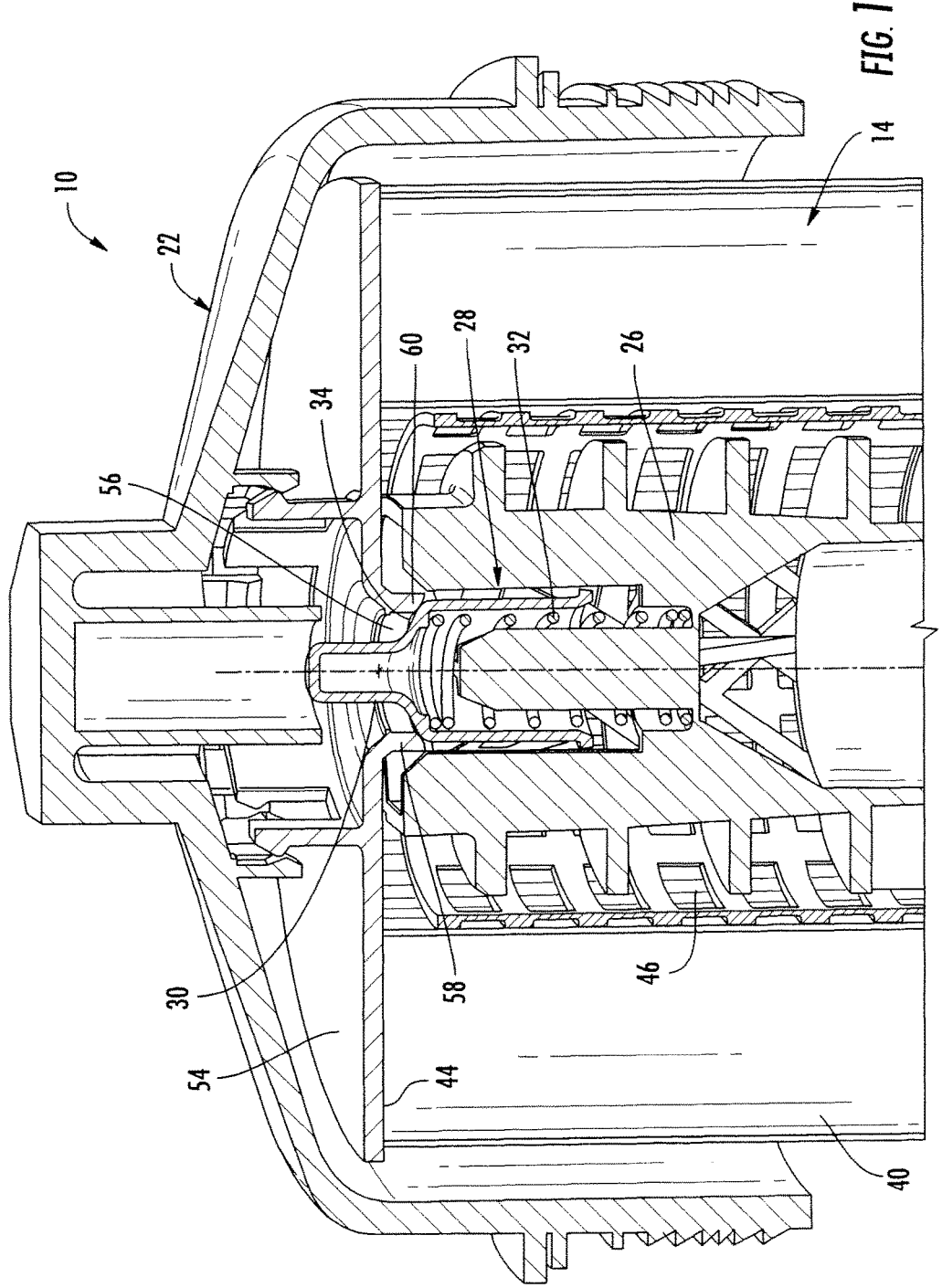
FIG. 1 is an exploded view of the liquid filter including a portion of the filter housing and the replaceable filter element.

FIGS. 1 and 8 illustrate a liquid filter 10 described herein that includes a filter housing 12 and a liquid filter element 14 removably disposed within the filter housing 12. For sake of convenience, the liquid filter 10 will be described as filtering lubrication oil, for example in an engine. However, the liquid filter 10 can be used to filter liquids other than oil including, but not limited to, engine fluids such as diesel fuel, hydraulic fluid, and other liquids.

The filter housing 12 includes a main housing body 16 with a base end 18, an open top end 20, and a removable lid 22 that is removably attached to the main housing body to close the open top end 20. The main housing body 16 defines an interior space 24 that in use receives the filter element 14. A centertube 26 extends upwardly from the base end 18 toward the open end 20 through which fluid that has been filtered by the filter element 14 can flow out of the filter housing 12 to downstream components. A bypass valve mechanism 28 is disposed on the centertube 26. The bypass valve mechanism 28 includes a valve 30 that is biased upwardly by a spring 32. The valve 30 includes an upwardly facing conical surface 34 that in use is configured to mate with a mating surface (described below) on the filter element 14 when the filter element is installed. The filter housing 12 described so far is conventional, and further information can be found in U.S. Pat. No. 5,770,054, incorporated herein by reference in its entirety.

The filter element 14 includes a ring of filtration media 40 having a first end 42 and a second end 44 and circumscribing a central cavity 46. The filtration media 40 is designed to filter the liquid with which it is used, in this example lubrication oil. A first endcap 48 is sealingly attached to the first end 42 of the filtration media 40. The first endcap 48 includes a centertube opening 50 through which the centertube 26 of the filter housing passes when the liquid filter element 14 is installed in the filter housing. A seal 52 disposed on the filter element around the opening 50 seals with the outside of the centertube 26 to prevent fluid leakage between the first endcap 48 and the centertube.

A second endcap 54 is sealingly attached to the second end 44 of the filtration media 40. The second endcap 54 includes a bypass fluid opening 56 that is opposite and coaxial to the centertube opening 50 in the first endcap 48. The bypass fluid opening 56 is defined by a cylindrical sealing flange 58 that extends downwardly from the second endcap 54 in a direction toward the first endcap 48 and into the central cavity 46.

The cylindrical sealing flange 58 includes a free end 60 that is designed to mate with the conical surface 34 of the valve 30 when the liquid filter element is installed in the filter housing. The free end 60 of the sealing flange 58 seals, but not completely, with the conical surface 34 to inhibit bypass flow of the liquid past the filter element.

The cylindrical sealing flange 58 includes air vent means that permits air that accumulates in the area above the second endcap 54 to bleed past the cylindrical sealing flange 58 and the conical surface 34 of the valve. The air vent means enables the rapid evacuation of trapped air in the top of the housing chamber above the second endcap, but permits only a negligible flow rate of oil through the air vent means once the air is evacuated. The air vent means allows the air to be quickly purged from the lid zone during pressurization with liquid. The air vent means can have a number of configurations as long as air can be evacuated and a negligible flow rate of liquid is permitted. Once the air has been purged, the small size of the air vent means dramatically limits the amount of liquid "leakage" flow that can bypass the filter media. For example, in the case of oil, the leakage flow may be less than 0.01% at normal filter differential pressure and high temperature oil conditions present in conventional lubrication oil filters, making the effect on particle removal efficiency and filter performance nil.

Figure 2:
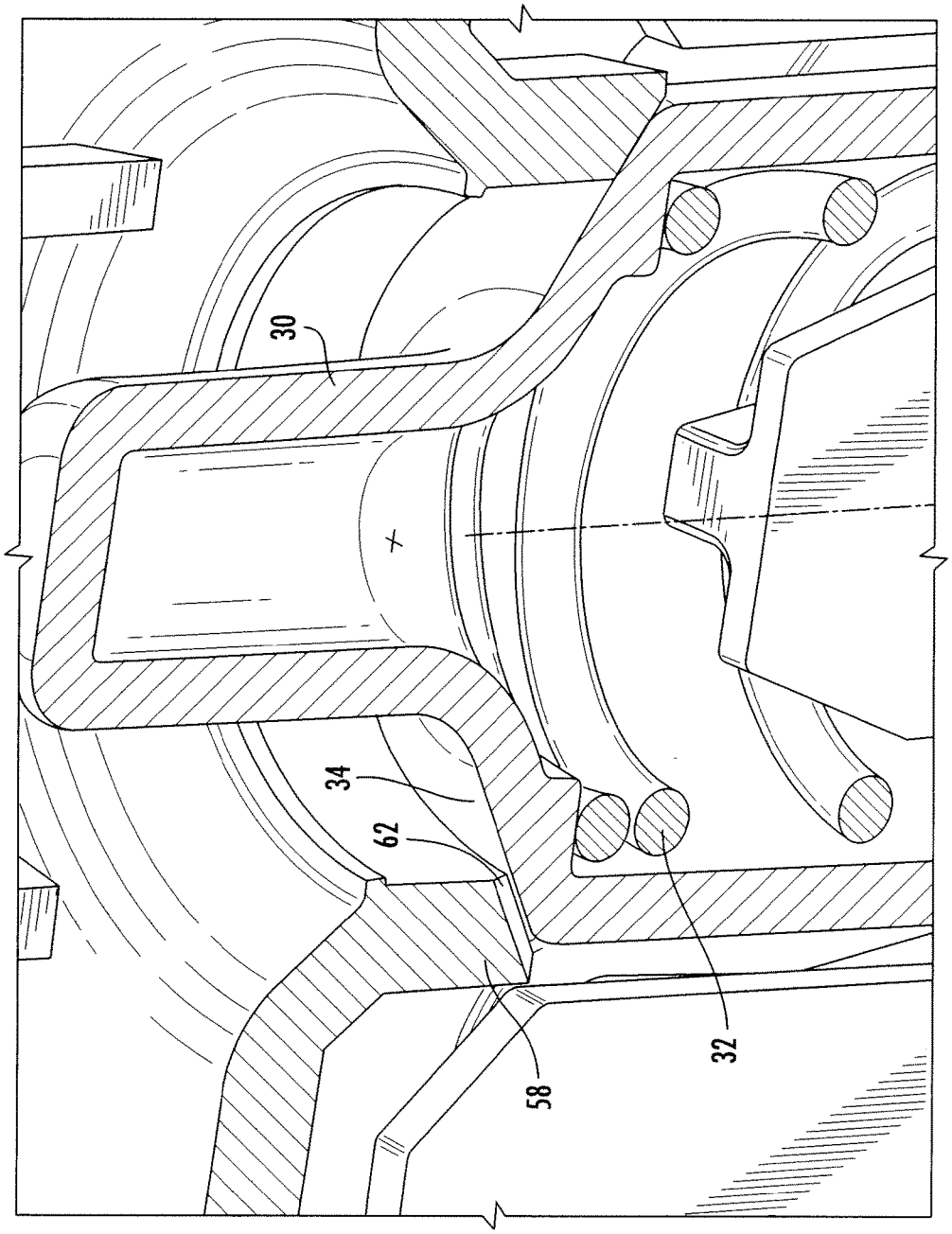
FIG. 2 is a close-up view of the interface between the replaceable filter element and the bypass valve of the filter housing showing an air vent means in the form of a notch.

With reference to FIG. 2, in one embodiment, the air vent means includes one or more notches 62 formed at the free end 60 of the flange 58. The notch 62 can be formed by any suitable process, for example by integrally molding the notch during formation of the endcap 54. The notch 62 can have a profile that is square (see FIG. 3B), rounded (see FIG. 3A) or any other shape. The notch 62 can extend radially relative to a central axis of the filter (see FIGS. 3A-B), or the notch 62 can be curved in a spiral shape at the free end 60, or the notch could be at an angle relative to radial but still linear (see FIG. 3C). A single notch could be provided as illustrated in FIGS. 1-3A, or more than one notch could be used. In one non-limiting example, the notch 62 can be less than about 0.5 mm in width and depth.

The notch 62 permits air located at the top of the filter 10 to bleed past the flange 58 and the valve 30 to purge air from the filter. The air flows from the top of the filter into the centertube 26 and ultimately back to the oil sump. Once the air is vented, the notch 62 permits a very small amount of oil to bleed past the flange 58 and the valve 30 as well.

With reference to FIG. 4, an embodiment is illustrated that uses a filtration media 64 positioned immediately adjacent to the outlet of the notch 62 to filter the bypass oil that flows through the notch 62. In the illustrated example, the media 64 is in the form of a circumferential ring that is attached to the free end 60 of the flange 58 at or near the outlet of the notch. The filtration media 64 could instead be a patch of filter media (i.e. not a circumferential ring) located only near the outlet of the notch 62. The media 64 should be positioned between the free end 60, the valve 30 and the upper end of the centertube 26 to prevent the bypass oil from bypassing the media 64.

With reference to FIG. 5, another embodiment is illustrated that uses a filtration media 66 positioned immediately adjacent to the inlet of the notch 62 to filter the bypass oil that flows through the notch 62 before it flows through the notch. In the illustrated example, the media 66 is in the form of a circumferential ring that is attached to the interior surface 68 of the flange 58 at or near the inlet of the notch. The filtration media 66 could instead be a patch of filter media (i.e. not a circumferential ring) located only near the inlet of the notch 62. The media 66 should be positioned between the flange 58 and the valve 30 to prevent the bypass oil from bypassing the media 66.

FIG. 6 illustrates another embodiment where the air vent means is foliated by a circumferential ring of filtration media 70. In this example, the media 70 is attached to the free end 60 and engages with the conical surface 34 of the valve 30. The porosity of the ring of filter media 70 provides the air venting, and the filter media 70 also filters any bypass leakage flow. The air venting and bypass flow in this embodiment would be 360 degrees. However, the ring of media 70 could be formed with one or more non-porous zones in order to tailor the amount and/or location(s) of the air and liquid bypass flow.

FIG. 7 illustrates an embodiment where the free end 60 of the flange 58 appears to seal with the conical surface 34 of the valve 30. However, the surface 72 of the free end 60 of the flange 58 that faces the conical surface 34 is provided with texturing which forms the air vent means. The texturing can be, for example, a bumpy texture, or any texture that allows air venting and a small amount of liquid bypass flow as shown by the arrows. The texturing would also essentially filter the leakage oil by virtue of the texture height which can be, for example, on order of less than 100 micron. The texturing can be located around the entire circumference of the surface 72, or located at one or more portions of the surface 72 in order to tailor the amount and/or location(s) of the air and liquid bypass flow.

In one embodiment, the air vent means may be an air vent. According to another embodiment, the cylindrical sealing flange includes an air vent permitting air to bleed past the cylindrical sealing flange when the liquid filter element is installed in the filter housing. The air vent may be formed by one or more of: a notch formed in the free end of the cylindrical sealing flange; a filter disk attached to the free end of the cylindrical sealing flange; a texture provided at the free end of the cylindrical sealing flange; and a hole 59 formed in the cylindrical sealing flange 58 adjacent to the free end 60, as shown in FIG. 9. A filter disk may be attached to the cylindrical sealing flange upstream of or downstream of the air vent. In another embodiment, an air vent may be formed on one or both of the cylindrical sealing flange and the bypass valve, the air vent permitting air to bleed past the cylindrical sealing flange and the bypass valve.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed:

1. A method of providing air venting from a liquid filter that includes a top load filter housing and a filter element removably installable in the top load filter housing, the top load filter housing includes a centertube and a bypass valve on the centertube, and the filter element includes a cylindrical sealing flange that is designed to engage with the bypass valve when the filter element is installed in the top load filter housing, the method comprising:
    installing the filter element in the filter housing, such that an air vent formed in the cylindrical sealing flange permits air to bleed past the cylindrical sealing flange, the air vent comprising one or more of:
        a notch in the free end of the cylindrical sealing flange;
        a filter disk attached to the free end of the cylindrical sealing flange;
        a texture at the free end of the cylindrical sealing flange; and
        a hole formed in the cylindrical sealing flange adjacent to the free end.

2. The method of claim 1, wherein the air vent comprises the filter disk and further comprising attaching the filter disk to the cylindrical sealing flange at a position so that the filter disk filters liquid that flows through the air vent.

3. The method of claim 2, comprising attaching the filter disk to the cylindrical sealing flange upstream of or downstream of the air vent.

4. A liquid filter, comprising:
    a filter housing with a removable lid at a top of the housing, a centertube, and a bypass valve on the centertube; and
    a liquid filter element removably disposed within the filter housing, the liquid filter element including:
        a ring of filtration media having a first end and a second end and circumscribing a central cavity;
        a first endcap sealingly attached to the first end of the filtration media, the first endcap including a centertube opening through which the centertube of the filter housing can pass when the liquid filter element is installed in the filter housing;
        a second endcap sealingly attached to the second end of the filtration media, the second endcap including a bypass fluid opening that is opposite and coaxial to the centertube opening in the first endcap;
        the bypass fluid opening is defined by a cylindrical sealing flange that extends from the second endcap in a direction toward the first endcap and the central cavity, the cylindrical sealing flange includes a free end that is designed to seal with the bypass valve on the centertube when the liquid filter element is installed in the filter housing; and
        the cylindrical sealing flange includes an air vent permitting air to bleed past the cylindrical sealing flange when the liquid filter element is installed in the filter housing,
    the air vent comprises one or more of:
        a notch formed in the free end of the cylindrical sealing flange;
        a filter disk attached to the free end of the cylindrical sealing flange;
        a texture provided at the free end of the cylindrical sealing flange; and
        a hole formed in the cylindrical sealing flange adjacent to the free end.

5. The liquid filter of claim 4, wherein the air vent comprises the filter disk, the filter disk being attached to the cylindrical sealing flange at a position so that the filter disk filters liquid that flows through the air vent.

6. The liquid filter of claim 5, wherein the filter disk is attached to the cylindrical sealing flange upstream of or downstream of the air vent.

7. A liquid filter element configured for disposition within a filter housing, comprising:
    a ring of filtration media having a first end and a second end and circumscribing a central cavity;
    a first endcap sealingly attached to the first end of the filtration media, the first endcap including a centertube opening through which a centertube of the filter housing can pass when the liquid filter element is installed in the filter housing;
    a second endcap sealingly attached to the second end of the filtration media, the second endcap including a bypass fluid opening that is opposite and coaxial to the centertube opening in the first endcap;
    the bypass fluid opening is defined by a cylindrical sealing flange that extends from the second endcap in a direction toward the first endcap and the central cavity, the cylindrical sealing flange includes a free end that is designed to seal with a bypass valve on the centertube when the liquid filter element is installed in the filter housing; and
    the cylindrical sealing flange includes an air vent permitting air to bleed past the cylindrical sealing flange when the liquid filter element is installed in the filter housing,
    the air vent comprising one or more of:
        a notch formed in the free end of the cylindrical sealing flange;
        a filter disk attached to the free end of the cylindrical sealing flange;
        a texture provided at the free end of the cylindrical sealing flange; and
        a hole formed in the cylindrical sealing flange adjacent to the free end.

8. The liquid filter element of claim 7, wherein the air vent comprises the filter disk, the filter disk being attached to the cylindrical sealing flange at a position so that the filter disk filters liquid that flows through the air vent.

9. The liquid filter element of claim 8, wherein the filter disk is attached to the cylindrical sealing flange upstream of or downstream of the air vent.

10. A liquid filter, comprising:
    a filter housing with a removable lid at a top of the housing, a centertube, and a bypass valve on the centertube; and
    a liquid filter element removably disposed within the filter housing, the filter element including:
        a ring of filtration media having a first end and a second end and circumscribing a central cavity;
        a first endcap sealingly attached to the first end of the filtration media, the first endcap including a centertube opening through which the centertube of the filter housing passes;
        a second endcap sealingly attached to the second end of the filtration media, the second endcap including a bypass fluid opening that is opposite and coaxial to the centertube opening in the first endcap, the bypass fluid opening defined by a cylindrical sealing flange that extends from the second endcap in a direction toward the first endcap and the central cavity, the cylindrical sealing flange including a free end that seals with the bypass valve on the centertube; and an air vent formed on the cylindrical sealing flange, the air vent permitting air to bleed past the cylindrical sealing flange and the bypass valve, the air vent comprising one or more of:
- a notch formed in the free end of the cylindrical sealing flange;
- a filter disk attached to the free end of the cylindrical sealing flange;
- a texture provided at the free end of the cylindrical sealing flange; and
- a hole formed in the cylindrical sealing flange adjacent to the free end.

* * * * *